United States Patent [19]

Huang

[11] Patent Number: 5,612,496
[45] Date of Patent: Mar. 18, 1997

[54] PRESSURE GAUGE BEING CAPABLE OF AUTOMATICALLY STOPPING SUPPLY OF PRESSURE FROM A PRESSURE SOURCE

[76] Inventor: Tien-Tsai Huang, No. 4-2, Lane 30, Wu-Chang St., Pan-Chiao City, Taipei Hsien, Taiwan

[21] Appl. No.: 513,008

[22] Filed: Aug. 9, 1995

[51] Int. Cl.$^6$ .................................. G01L 7/00
[52] U.S. Cl. ....................................... 73/709
[58] Field of Search ........................ 73/706, 709, 711, 73/740, 146.5; 116/290, 291, 292, 293; 340/442, 447

[56] References Cited

U.S. PATENT DOCUMENTS

| | | | |
|---|---|---|---|
| 4,063,459 | 12/1977 | Prell | 73/711 |
| 4,111,057 | 9/1978 | Affeldt et al. | 73/709 |
| 4,196,690 | 4/1980 | Alinar | 73/709 |
| 4,385,525 | 5/1983 | Phillips et al. | 73/720 |
| 5,130,694 | 7/1992 | Zainaleian | 340/442 |
| 5,289,161 | 2/1994 | Huang | 340/447 |

*Primary Examiner*—Richard Chilcot
*Assistant Examiner*—William L. Oen
*Attorney, Agent, or Firm*—Oblon, Spivak, McClelland, Maier & Neustadt, P.C.

[57] ABSTRACT

A pressure gauge includes a housing unit and a membrane which has a periphery secured to an inner wall of the housing unit, so as to define an air chamber under the membrane in the housing unit. The membrane has a central portion which can move upward in the housing unit in response to increase in air pressure of the air chamber. An adjustment rod has an externally threaded portion extending through and engaged threadably within the threaded hole of a guiding member which is secured in the housing unit. A microswitch is installed on a lower end portion of the adjustment rod and is connected electrically to a pressure source which supplies compressed air into an article to be measured by the gauge. The movement of the adjustment rod relative to the guiding member moves the microswitch in the housing unit to a predetermined position which corresponds to a preset upper limit value of air pressure of the air chamber. When the air pressure of the air chamber exceeds the preset upper limit value, the microswitch is contacted and activated by the central portion of the membrane to stop supply of compressed air from the pressure source into the article.

3 Claims, 5 Drawing Sheets

PRESSURE GAUGE BEING CAPABLE OF AUTOMATICALLY STOPPING SUPPLY OF PRESSURE FROM A PRESSURE SOURCE

BACKGROUND OF THE INVENTION

This invention relates to a pressure gauge, more particularly to a pressure gauge which can automatically stop supply of compressed air from a pressure source into an article when the air pressure of the article exceeds a preset value.

The improvement of this invention is directed to the conventional pressure gauge shown in FIGS. 1 and 2. As illustrated, the conventional pressure gauge 10 includes an air chamber 11, a pressure-value indicating panel 12, an adjustment knob 13, a driving lever 14 secured to the adjustment knob 13 so as to rotate synchronously therewith, a driven lever 15 with a fixed upper post 151, a pressure-value indicating pointer 16 for displaying the pressure of the chamber 11, a stop post 17 fastened to and located under the driven lever 15, and a power controlling switch 18 fixed on the panel 12. By rotating the adjustment knob 13 relative to the panel 12, the driving lever 14 impels the driven lever 15 to rotate clockwise to a predetermined position in the gauge 10 which corresponds to a preset upper limit value of air pressure. In a situation where compressed air is supplied from a pressure source into an article whose pressure value is being measured by the gauge 10, when the air pressure of the air chamber 11 exceeds the preset upper limit value, the pointer 16 rotates in the gauge 10 to a position where the pointer 16 contacts the stop post 17 so as to activate the switch 18 to stop the supply of the compressed air from the pressure source into the article. The conventional pressure gauge 10 suffers from the following disadvantages:

(1) The pressure gauge 10 needs a bulky housing to accommodate a large number of parts therein, thereby limiting the applicability of the pressure gauge 10 in industry.

(2) To reduce the preset upper limit pressure value, it is necessary to first pull the adjustment knob 13 upward so as to ascend the driving lever 14 to a level above the upper end of the upper post 151. Then, the adjustment knob 13 is rotated clockwise until the driving lever 14 passes beyond the upper post 151 so that the driving lever 14 can be descended. At this time, the adjustment knob 14 can be rotated counterclockwise to impel the driven lever 15. This adjustment process is time-consuming and troublesome for the user.

(3) Because the adjustment to the preset pressure value is achieved by the operations of the parts 13, 15, 16, 18, when any one of the parts 13, 15, 16, 18 is broken or curved, the gauge 10 may malfunction or cannot display accurately the pressure value of the air chamber 11.

SUMMARY OF THE INVENTION

An object of this invention is to provide a compact pressure gauge which can automatically stop the supply of compressed air from a pressure source into an article to be measured and in which the upper limit pressure value can be easily adjusted.

According to this invention, a pressure gauge includes a housing unit with an air passage formed therein. The air passage has an air inlet which is communicated fluidly with the exterior of the gauge and with an article whose pressure value is to be measured. A membrane has a periphery secured to an inner wall of the housing unit in a such a manner that an air-tight seal is established therebetween, so as to define an air chamber under the membrane in the housing unit. The air chamber is communicated fluidly with the air passage. The membrane has a central portion which can move upward in the housing unit in response to increase in air pressure of the air chamber. A pressure-value indicating panel is secured in the housing unit above the membrane. A tubular guiding member is secured in the housing unit above the panel and has a threaded hole formed therethrough. A transparent cover is secured on the housing unit above the guiding member. An adjustment rod has an externally threaded portion extending through and engaged threadably within the threaded hole of the guiding member. The adjustment rod can be actuated so as to rotate and move relative to the housing unit. A pointer is mounted securely on the adjustment rod so as to indicate the preset upper limit value of the air pressure of the air chamber. A microswitch is installed on a lower end portion of the adjustment rod and is connected electrically to a pressure source which supplies compressed air into the article. The movement of the adjustment rod relative to the guiding member moves the microswitch in the housing unit to a predetermined position which corresponds to a preset upper limit value of air pressure of the air chamber. When the air pressure of the air chamber exceeds the preset upper limit value, the microswitch is contacted and activated by the central portion of the membrane to stop supply of compressed air from the pressure source into the article.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
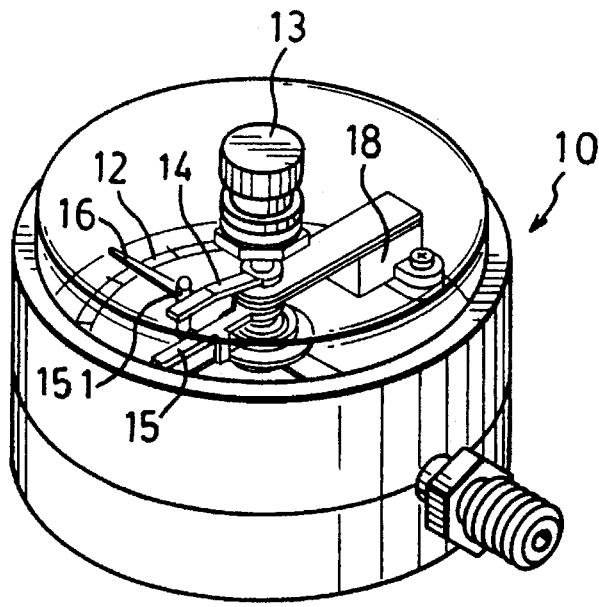
FIG. 1 is a perspective view of a conventional pressure gauge.
Figure 2:
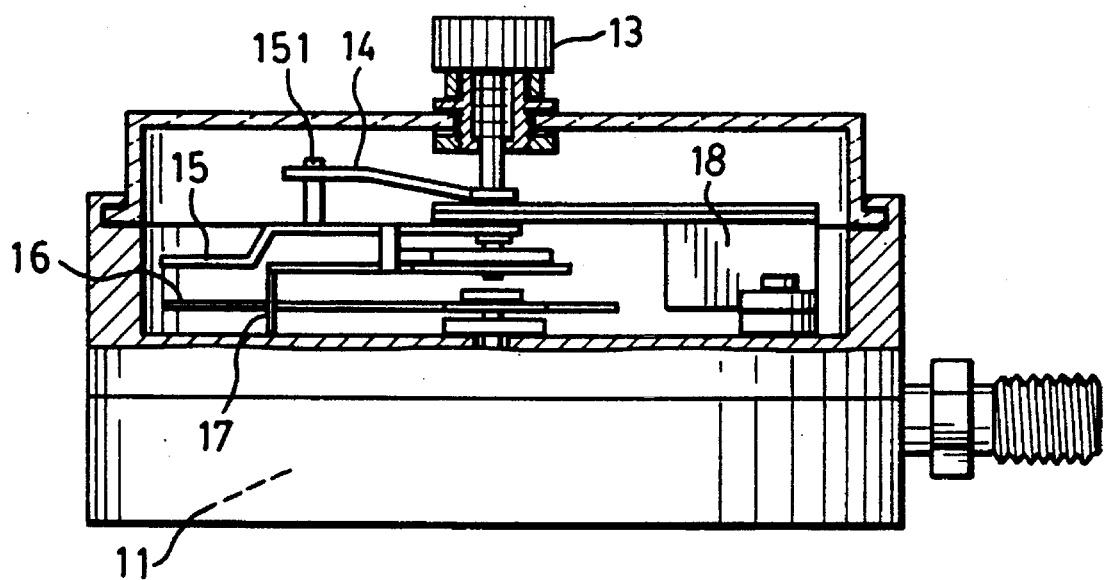
FIG. 2 is a sectional view of the conventional pressure gauge.
Figure 3:
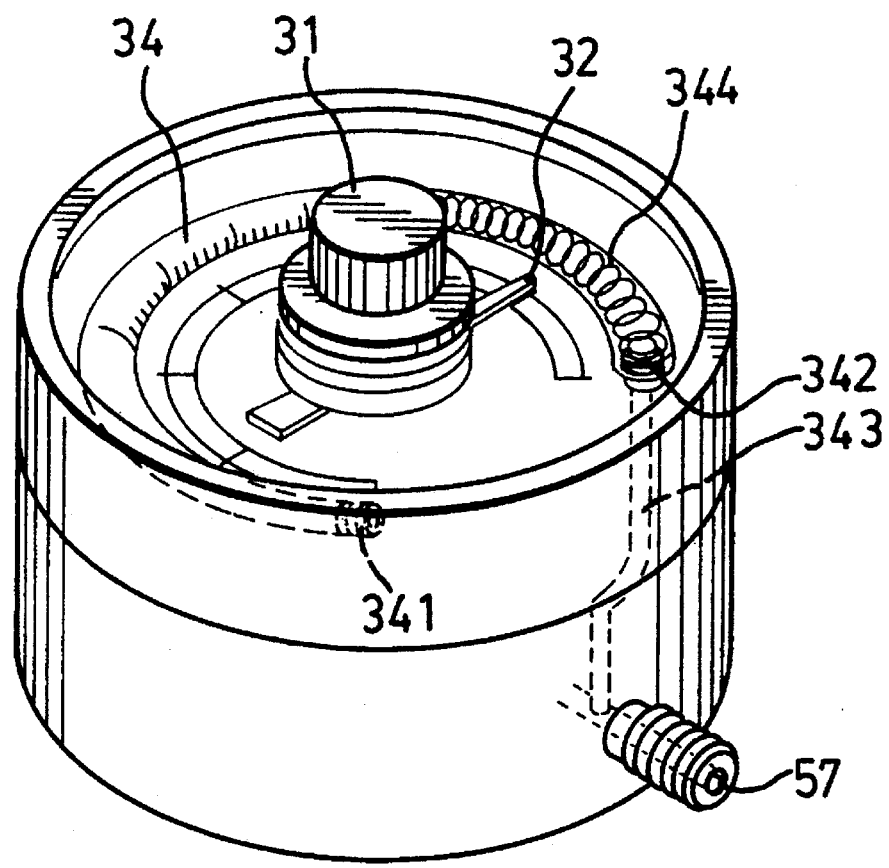
FIG. 3 is a perspective view showing the pressure gauge of this invention.
Figure 4:
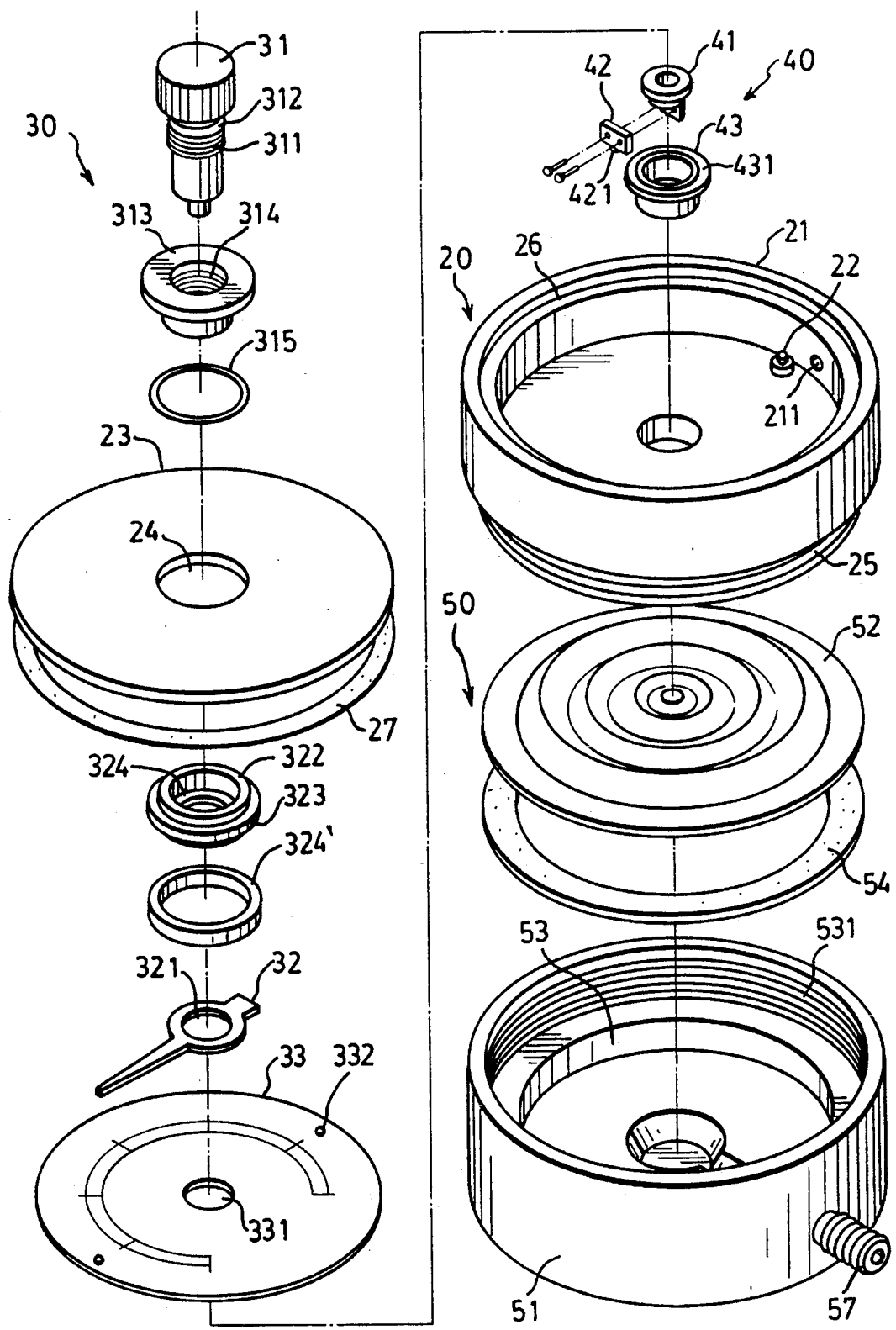
FIG. 4 is an exploded view of a pressure gauge according to this invention.
Figure 5:
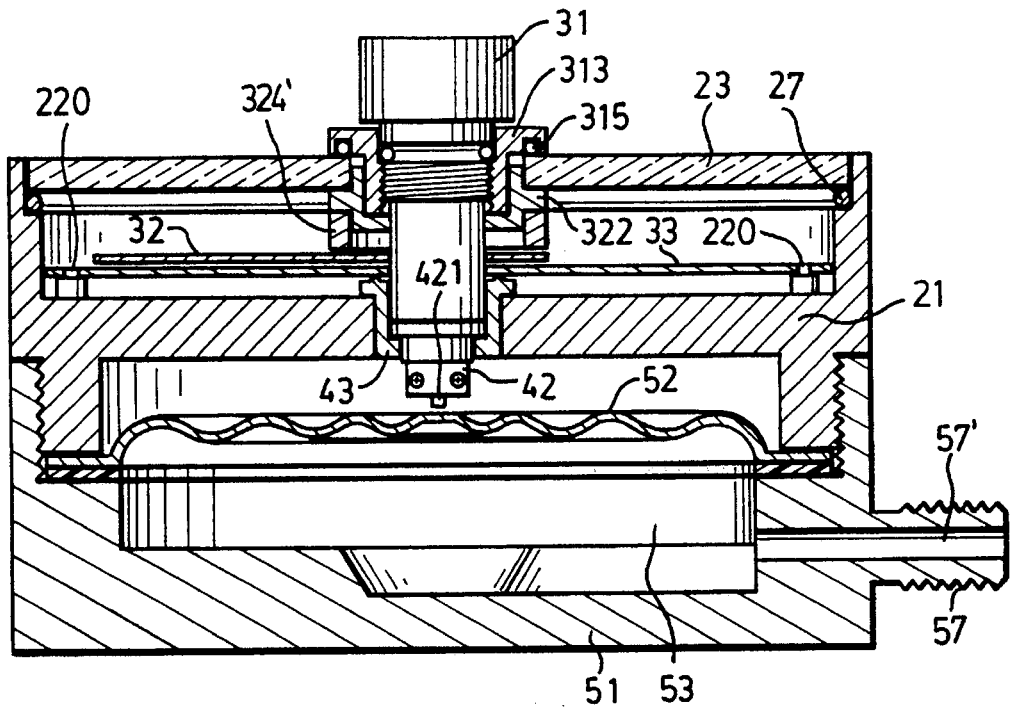
FIG. 5 is a sectional view showing the pressure gauge of this invention.

Referring to FIGS. 3, 4 and 5, a pressure gauge of this invention includes an upper housing assembly 20, a pressure-value setting assembly 30, a power controlling assembly 40 and a detecting assembly 50.

The upper housing assembly 20 includes a bowl-shaped upper housing 21, two aligned posts 22 fixed on the bottom wall of the upper housing 21, and a transparent cover 23 shaped in the form of a circular ring and having a circular hole 24. The upper housing 21 has an externally threaded lower end portion 25 and a stepped upper end portion 26. Two cable holes 211 (only one is shown in FIG. 4) are formed through the peripheral wall of the upper housing 21 so as to permit cables to pass therethrough to couple with the power controlling assembly 40. The cover 23 is press fitted within and adhered to the stepped upper end portion 26 of the upper housing 21, in such a manner that an O-ring 27 is clamped therebetween so as to establish an air-tight seal therebetween.

The pressure-value setting assembly 30 includes an adjustment rod 31, a pointer 32 formed with a central hole 321 and sleeved fixedly on the adjustment rod 31, and a pressure-value indicating panel 33 with a central hole 331. The panel 33 further has two diametrically opposed holes 332 formed therethrough into which the tongues 220 (see FIG. 5) of the posts 22 of the upper housing 21 are respectively inserted. The adjustment rod 31 has an externally threaded middle section 311 on which a stop ring 312 is sleeved tightly. A guiding member 313 extends through the central hole 24 of the cover 23, the central hole 321 of the pointer 32, and the central hole 331 of the panel 33, and has a threaded hole 314 within which the externally threaded middle section 311 of the adjustment rod 31 is engaged threadably, so that rotation of the adjustment rod 31 relative to the guiding member 313 can move the adjustment rod 31 vertically on the guide member 313. An O-ring 315 is interposed between the guiding member 313 and the cover 23 so as to establish an air-tight seal therebetween. The lower end portion of the guiding member 313 is press fitted within a receiving space of a hollow cylindrical retainer 322. The retainer 322 has an outward flange 323 projecting radially and outwardly from the middle portion thereof, and an inward flange 324 which projects radially and inwardly from the lower end of the retainer 322 and which defines the receiving space in the retainer 322 over the inward flange 324 so as to receive the lower end portion of the guiding member 313. The outward flange 323 of the retainer 322 abuts against the bottom surface of the cover 23. A ring 324' is sleeved tightly on the lower end of the retainer 322 for decorative purposes and is located over and spaced apart from the pointer 32.

The power controlling assembly 40 includes a fastening piece 41 sleeved fixedly on the lower end of the adjustment rod 31, a power controlling member 42 bolted to the fastening piece 41 and equipped with a microswitch 421 installed on the lower end of the power controlling member 42 and connected electrically to a pressure source which is adapted to supply compressed air into an article to be measured by the gauge, and a tubular protective member 43 having an outward flange 431 which projects radially and outwardly from the upper end of the protective member 43 and which is clamped between the panel 33 and the horizontal bottom wall of the upper housing 21 so as to be positioned in the gauge. The adjustment rod 31 can be rotated relative to the guiding member 313 so as to move the microswitch 421 downward in the housing unit to a predetermined position which corresponds to a preset upper limit value of the air pressure of the air chamber 53 of the detecting assembly 50. The length of the horizontal sides of the power controlling member 42 is larger than the diameter of the central hole of the protective member 43 so as to limit the uppermost position of the power controlling member 42 relative to the protective member 43, thereby limiting the adjustable range of the adjustment rod 31.

The detecting assembly 50 includes a lower housing 51 and a disc-shaped membrane 52. The lower housing 51 has an internally threaded upper end portion 531 which is engaged threadably with the externally threaded lower end portion 25 of the upper housing 21 so as to together constitute a housing unit. The membrane 52 is interposed between the upper and lower housings 21, 51. A sealing ring 54 is clamped between the membrane 52 and the lower housing 51 so as to establish an air-tight seal therebetween, thereby defining the air chamber 53 under the membrane 52 in the lower housing 51. A tubular connector 57 is integrally formed with and extends radially and outwardly from the lower housing 51. An air passage 57' (see FIG. 5) is formed in the lower housing 51 and is communicated fluidly with the exterior of the lower housing 51 and the air chamber 53.

Figure 6:
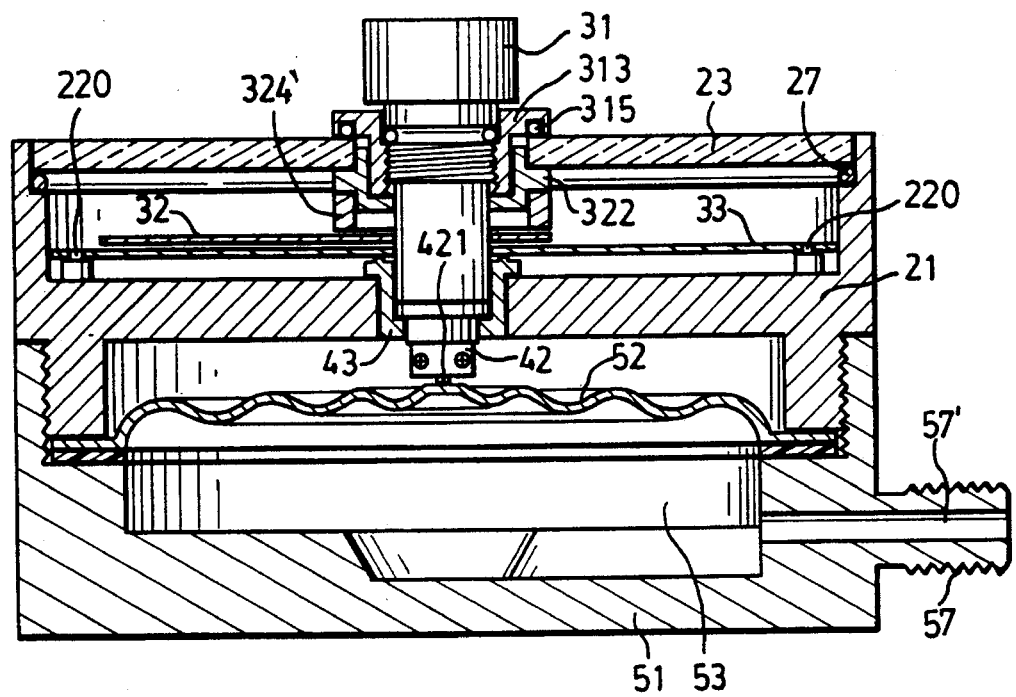
FIG. 6 is a schematic sectional view illustrating how a microswitch is activated by the central portion of a membrane in the pressure gauge in accordance with this invention.

In use, in a situation where the pressure source is supplying compressed air into the article which is being measured by the gauge of this invention, when the air pressure of the air chamber 53 exceeds the preset upper limit value, the central portion of the membrane 52 moves upward from the position of FIG. 5 to that of FIG. 6 so as to contact and activate the microswitch 421 to turn off the power of the pressure source, thereby stopping supply of compressed air from the pressure source into the article.

Figure 7:
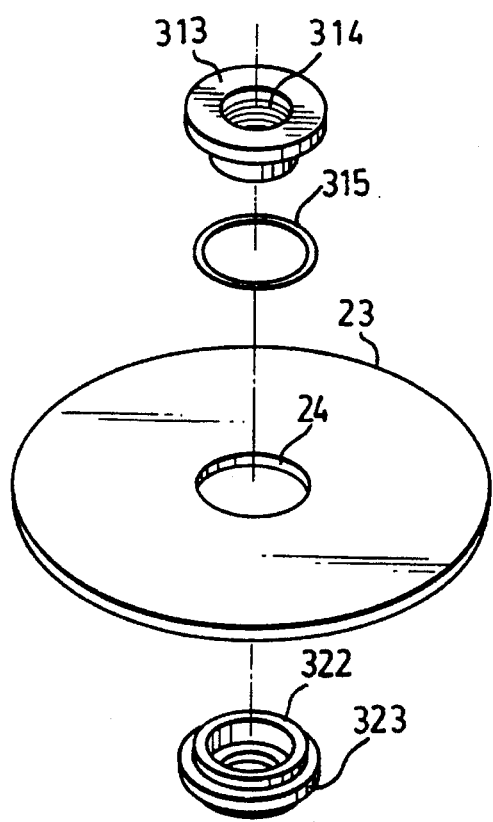
FIG. 7 is an exploded view showing means for guiding an adjustment rod to move vertically in the pressure gauge according to this invention.
Figure 8:
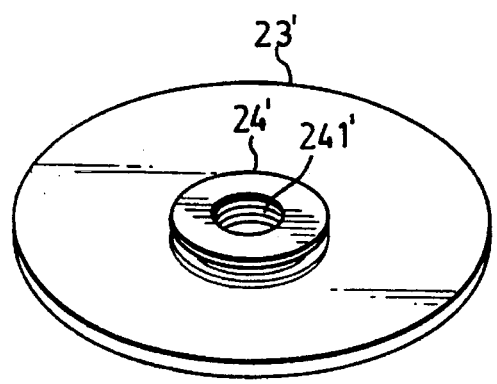
FIG. 8 is a perspective view showing a modified means for guiding the adjustment rod to move vertically in the pressure gauge according to this invention.

In this embodiment, means for guiding an adjustment rod 31 to move vertically in the pressure gauge is shown in FIG. 7 and can be replaced with the simplified construction shown in FIG. 8, which includes a cover 23' shaped in the form of a circular ring, and a guiding member 24' extending through and secured within the central hole of the cover 23'. The guiding member 24' has a threaded central hole 241'.

With this invention thus explained, it is apparent that numerous modifications and variations can be made without departing from the scope and spirit of this invention. It is therefore intended that this invention be limited only as indicated in the appended claims.

I claim:

1. A pressure gauge comprising:

a housing unit with an air passage formed therein, said air passage having an air inlet which is communicated fluidly with an exterior of said gauge and which is adapted to be communicated fluidly with an article whose pressure value is to be measured;

a membrane having a periphery secured to an inner wall of said housing unit in a such a manner that an air-tight seal is established therebetween, so as to define an air chamber under said membrane in said housing unit, said air chamber being communicated fluidly with said air passage, said membrane having a central portion which can move upward in said housing unit in response to increase in air pressure of said air chamber;

a pressure-value indicating panel secured in said housing unit above said membrane;

a tubular guiding member secured in said housing unit above said panel and having a threaded hole formed therethrough;

a transparent cover secured on said housing unit above said guiding member;

an adjustment rod having an externally threaded portion extending through and engaged threadably within said threaded hole of said guiding member, said adjustment rod being capable of being actuated so as to rotate and move relative to said housing unit; and a pointer mounted securely on said adjustment rod so as to indicate a preset upper limit value of air pressure of said air chamber;

a microswitch installed on a lower end portion of said adjustment rod and adapted to be connected electrically to a pressure source which is adapted to supply compressed air into said article, rotation of said adjustment rod relative to said guiding member moving said microswitch in said housing unit to a predetermined position which corresponds to the preset upper limit value of air pressure of said air chamber, said microswitch being capable of being contacted and activated by said central portion of said membrane to stop supply of compressed air from said pressure source into said article when the air pressure of said air chamber exceeds the preset upper limit value.

2. A pressure gauge as claimed in claim 1, wherein said cover is shaped in the form of a circular ring and has a central hole formed therethrough, said guiding member extending through said central hole of said cover and having a flange extending radially and outwardly from an upper end thereof, said gauge further including an O-ring interposed between said flange of said guiding member and said cover so as to establish an air-tight seal therebetween, and a hollow cylindrical retainer having an inward flange projecting radially and inwardly from a lower end thereof so as to define a receiving space over said inward flange in said retainer, said guiding member having a lower end portion which is press fitted within said receiving space of said retainer.

3. A pressure gauge as claimed in claim 1, wherein said cover is shaped in the form of a circular ring and has a central hole formed therethrough, said guiding member extending through and secured within said central hole of said cover.

* * * * *